June 20, 1967 — H. N. GREENLEE, JR — 3,325,916
AUDIO-VISUAL COMBINATION EDUCATIONAL DEVICE AND TOY
Filed Dec. 17, 1964

INVENTOR.
Howard N. Greenlee, Jr.
BY Parker & Carter
Attorneys.

3,325,916
AUDIO-VISUAL COMBINATION EDUCATIONAL
DEVICE AND TOY
Howard N. Greenlee, Jr., Chicago, Ill., assignor to
Mattel, Inc., a corporation of California
Filed Dec. 17, 1964, Ser. No. 419,040
2 Claims. (Cl. 35—35)

ABSTRACT OF THE DISCLOSURE

A visual-phonetic device for simultaneously displaying and sounding out a common message including a plurality of message carriers each having a sound source means and corresponding visual indica thereon. A receiver is adapted to receive and hold the message carriers in any desired sequence and a sound generating means is mounted on the visual-phonetic device and is adapted to engage the sound source means. A means for moving the receiver and thereby the message carriers generates a phonetic and visual message.

---

This invention relates in general to visual-phonetic devices, and in particular to a visual-phonetic device which is especially adapted for use as an educational toy for young children, though it might with little or no modification be used as a teaching aid, particularly in the teaching of a foreign language.

Accordingly, a primary object of the invention is to provide a device capable of being actuated to simultaneously display and sound out a common message.

Another object is to provide a device in which a plurality of message carriers may be interchangeably arranged in any desired sequence to thereby display and sound out a common message.

Another object is to provide an educational toy in which a plurality of interchangeable message carriers, which may, for example be pie shaped blocks, may be assembled one to the other to form a continuous thought composed of a series of visual words, and the words sounded out as the message carriers are moved past a common point.

Yet another object is to provide an educational toy for young children which includes a number of message carriers or blocks, each of which has a word thereon and a sound generating means carried by the block which, when actuated, sounds out the word, the blocks being assemblable by a child into combinations which spell out, and sound out, simple sentences.

Other objects and advantages of the invention will become apparent upon reading the following description.

Figure 1:
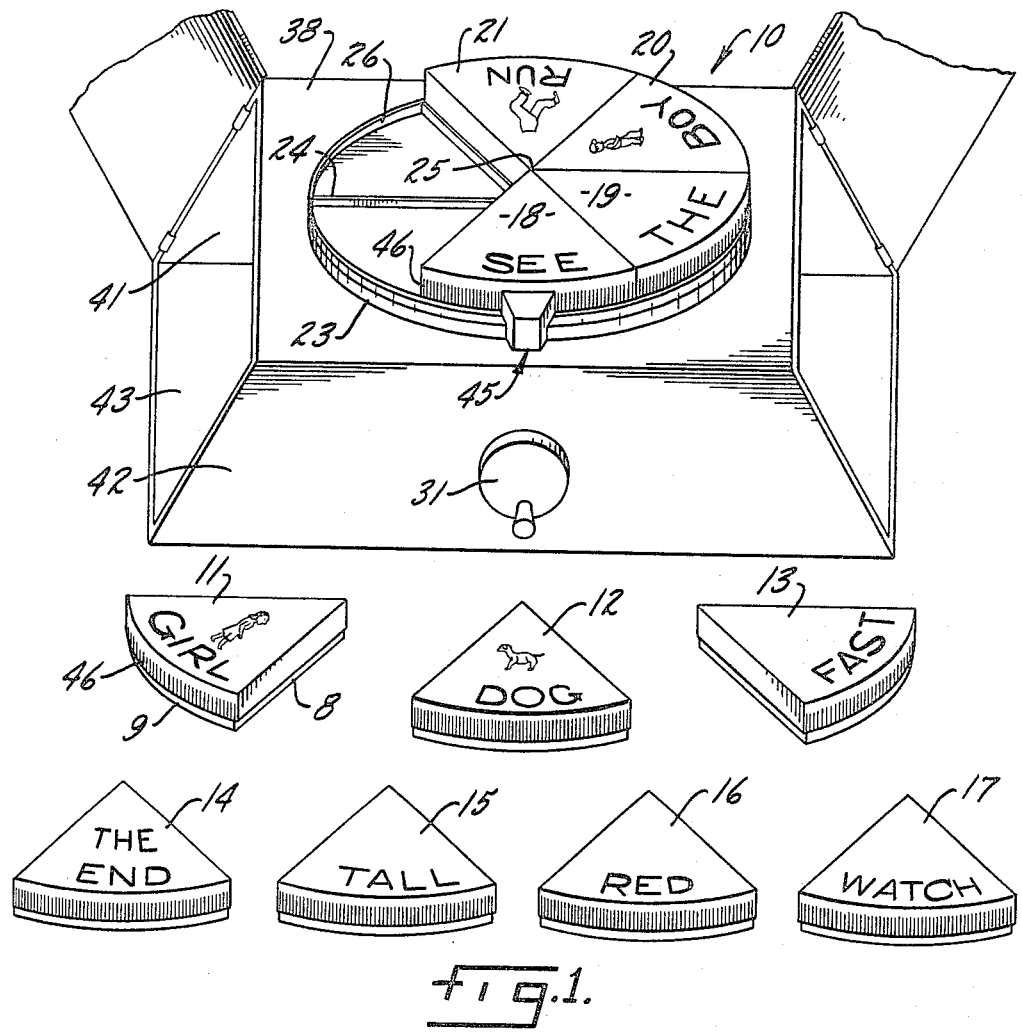
Figure 2:
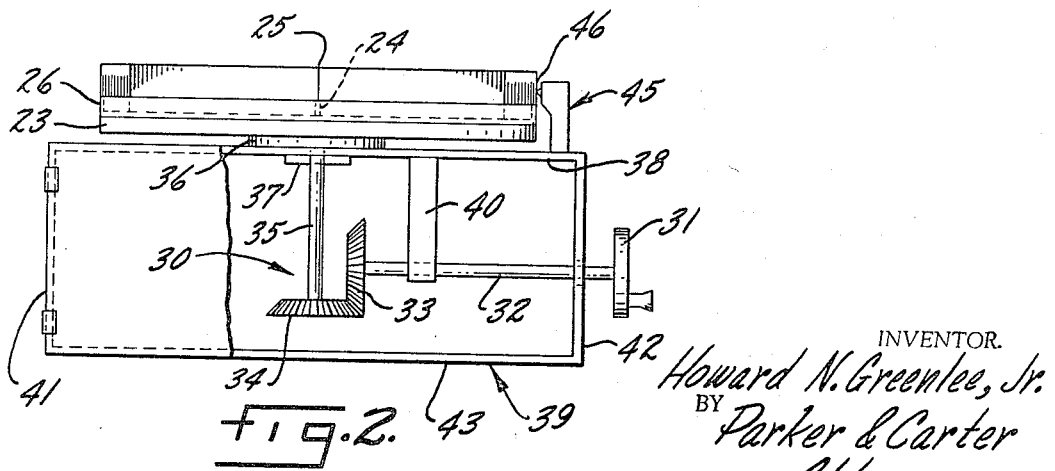

The invention is illustrated more or less diagrammatically in the accompanying drawings wherein:

FIGURE 1 is a perspective view of the invention with parts removed for clarity, and FIGURE 2 is a side elevation with parts broken away of the invention.

Like reference numerals will be used to refer to like parts throughout the following description of the invention.

The device is indicated generally at 10 in FIGURE 1. It includes a plurality of message carriers indicated at 11 through 21. Although eleven have been shown in this instance, it will become obvious as the description proceeds that a greater or lesser number may be employed.

Each message carrier is shown, in this instance, as a 3-dimensional sector of a circle. Each is of substantially identical configuration so that when a number are assembled as shown best in FIGURE 1, their edges will form a circular periphery. Each message carrier has a word such as "red," "girl," etc., on its upper exposed surface. In some instances the message carriers or blocks also include a picture. Thus, a picture of a girl is reproduced above the word "girl," a picture of a dog is reproduced above the word "dog," and so on. Further, if desired, the blocks can be color coded by parts of speech; that is, the nouns might for example be colored red, the verbs colored blue, the adjectives colored yellow, and so on. Alternately, the alphabet or numerals may be placed on the upper exposed surface instead of the simple words illustrated in FIGURE 1. With a set of numerals having the common words used in teaching the fundamentals of arithmetic, such as "plus," "minus," "equals," "goes into," and so forth, the system can be employed as an educational device for teaching basic arithmetic. The words, symbols, pictures or whatever is impressed or carried on the individual blocks, may however, be described generally as indicia.

Each block carries at its peripheral, arcuate edge a source of sound which in this instance is a roughened surface suitable for use with a reed scraper-needle and and a mechanical play back system. Alternately, magnetic flux or other electronic sound producing medium may be applied to the edge of the individual blocks.

The individual blocks or message carriers are assembled on a message carrier receiver or platform 23. The blocks are recessed along their lower peripheral edges as indicated at 8 and 9. As best seen from FIGURE 1, a plurality of ridges or restraining members 24 extend radially outwardly from the center 25 of the platform and a circular peripheral ridge 26 extends upwardly from the edge of the platform. The radial and circumferential ridges define a series of pockets into which the individual message carriers or blocks may be placed and thereby locked into position with respect to one another. The ridges 24, 26 fit into the indentations 8, 9 respectively, in the lower edges of the blocks.

The platform 23 is rotated by a drive system indicated generally at 30. In this instance a mechanical system consisting of a crank and crank wheel 31, crank shaft 32, a pair of gears 33, 34 and a drive shaft 35 are illustrated. It will be understood, however, that an electrical system may be employed. The electrical system may be either a conventional 115 volt AC system or a battery operated system.

The drive shaft 35 carries a spacer 36 and a restraining pin 37 which prevents unintended axial movement of the drive shaft with respect to the top 38 of the housing 39. A bracket 40 extends downwardly from the underside of top 38 to support the inner end of crank shaft 32.

Housing 39 consists in this instance of top 38, sides 41, 42 and bottom 43. If desired, doors may be provided on either end of the housing. In this instance, the housing is formed as a trapezoid in one illustration but it will be understood that the housing may be shaped in any manner which is asthetically pleasing to the eye. Likewise the particular construction of the housing may be varied within wide limits, its sole function in connection with the illustrated embodiment being to support the platform 23 and its drive system, and provide a storage chamber for the blocks.

The housing may be made of any suitable material such as a transparent material so that the talking blocks may be readily visible to the user.

A reed scraper-needle is indicated generally at 45. The needle is fixed to the top 38 of the storage chamber 39 and extends outwardly so as to contact the exterior, peripheral surface 46 of the blocks. Alternately, an electronic playback system may be employed. If an electronic system is used to rotate the platform, the same power source may be employed to produce the sound carried by the sound source 46 associated with the individual blocks.

The use and operation of the invention are as follows:

Assume the invention is employed as a pre-school educational toy for use by young children, or even by children of the first or second grade level in school who are learning the basics of sentence formation and reading.

To form a sentence, the child merely selects words which appear on the upper surface of individual blocks and places them on platform 23. With a relatively small number of blocks such as 30 or 40, and a judicious selection of words, a large number of sentences can be formed. Once the child has placed the blocks on platform 23, crank 31 is rotated. As the blocks pass the reed scraper needle the words are sounded out. If the child has inadvertently included a block which does not form a continuous thought, it will at once be apparent to his ear and he can stop the crank and replace the block rearranging it to make a thought having continuity.

The selection of the right word is made easier by the appearance of the object which the word describes on the surface of the blocks. This is particularly true with nouns such as "girl," "dog," "boy" as shown in FIGURE 1. Even some verbs can be illustrated such as the verb "run" by a pair of running legs. For further refinement the blocks can be color coded. That is, the part of speech represented by the blocks is correlated to a given color.

For example, nouns may be red, verbs blue, adjectives yellow and so on.

Preferably, a mechanical reed scraper-needle playback type system is employed. The child furnishes the power and the unit is simple and can be made very rugged in construction. Alternately, a source of power can be provided, either a battery source or a plug assembly for connection to a conventional outlet source.

Although several embodiments of the invention have been illustrated and described, it now at once becomes apparent to those skilled in the art that various modifications may be made within the scope of the invention. It is intended accordingly that the scope of the invention not be limited by the foregoing exemplary description.

I claim:

1. An educational toy, said toy including, in combination,
    a plurality of generally sector shaped, substantially identically contoured, message carriers,
    each message carrier having indicia thereon forming a word and a sound generating surface,
    a message carrier platform and supporting structure therefor,
    said platform and message carrier having means for interchangeably associating the message carriers to the platform,
    a sound generating actuator arranged to make contact with the sound generating surface on the message carriers, and
    manually operable means for rotating the platform, and thereby the message carriers supported thereon, along the circular path past the sound generating actuator to thereby generate the phonetic equivalent of the word carried by each message carrier as the platform moves past the sound actuator.

2. A visual-phonetic device, said device including, in combination,
    a plurality of message carriers of substantially rigid self-sustaining material each having visual indicia thereon,
    each message carrier having a sound surface corresponding to the visual indicia thereon,
    a message carirer receiver,
    the receiver being constructed and arranged to receive and hold a plurality of message carriers in any desired sequence with the sound surfaces of the several message carriers aligned,
    sound generating means mounted on said visual-phonetic device and adapted to engage said sound surfaces,
    the sound generating means including a stationary actuator positioned to engage directly and sequentially the sound surfaces of the message carriers on said receiver and which, when in engagement with the sound surfaces on the message carriers is capable of emitting an associated sound, and
    means for moving the receiver, and thereby the message carriers along a predetermined path oriented with respect to the actuator as to insure direct surface to surface contact between the actuator and the sound surfaces of the several message carriers on the receiver thereby generating a phonetic and visual message.

References Cited

UNITED STATES PATENTS

| | | | |
|---|---|---|---|
| 1,359,646 | 11/1920 | Zion | 35—35.8 |
| 2,548,011 | 4/1951 | Frost | 35—35.3 |

EUGENE R. CAPOZIO, *Primary Examiner.*

W. GRIEB, *Assistant Examiner.*